United States Patent [19]
Drent

[11] Patent Number: 4,831,114
[45] Date of Patent: May 16, 1989

[54] POLYMERIZATION OF CARBON MONOXIDE AND OLEFIN WITH ACID CATALYST

[75] Inventor: Eit Drent, Amsterdam, Netherlands

[73] Assignee: Shell Oil Company, Houston, Tex.

[21] Appl. No.: 74,668

[22] Filed: Jul. 17, 1987

[30] Foreign Application Priority Data

Oct. 1, 1986 [NL] Netherlands .......................... 8602476

[51] Int. Cl.$^4$ .............................................. C08G 67/02
[52] U.S. Cl. ...................................... 528/392; 502/162
[58] Field of Search .......................................... 528/392

[56] References Cited

U.S. PATENT DOCUMENTS

| 2,495,286 | 1/1950 | Brubaker | 260/63 |
| 3,448,140 | 6/1969 | Gamlen | 260/471 |
| 3,689,460 | 9/1972 | Nozaki | 260/63 |
| 3,694,412 | 9/1972 | Nozaki | 260/63 |
| 3,835,123 | 9/1974 | Nozaki | 260/94.9 |
| 4,076,911 | 2/1978 | Fenton | 526/11.1 |
| 4,474,978 | 10/1984 | Drent | 560/24 |

FOREIGN PATENT DOCUMENTS

| 121965 | 8/1984 | European Pat. Off. . |
| 181014 | 5/1986 | European Pat. Off. . |
| 1081304 | 3/1965 | United Kingdom . |
| 2058074 | 8/1979 | United Kingdom . |

OTHER PUBLICATIONS

Kirk Othmer Encyclopedia of Chemical Technology, Second Edition, vol. 12, p. 132, 1967.
Adv. Polym. Sci. 1986, 73-74, 125-144.

Primary Examiner—Harold D. Anderson
Attorney, Agent, or Firm—Dean F. Vance

[57] ABSTRACT

Linear alternating copolymers of carbon monoxide and at least one ethylenically unsaturated hydrocarbon are produced in the presence of novel catalysts formed from a Group VIII metal compound, an anion of a non-hydrohalogenic acid having a pKa above about 2 but below about 4, and certain bidentate ligands of phosphorus.

8 Claims, No Drawings

POLYMERIZATION OF CARBON MONOXIDE AND OLEFIN WITH ACID CATALYST

It is known that reaction of carbon monoxide with one or more ethylenically unsaturated hydrocarbons in the presence of a suitable catalyst results in the production of linear alternating polymer known as polyketones. Polymerization of carbon monoxide with at least one ethylenically unsaturated hydrocarbon, e.g., ethylene or mixtures of ethylene and propylene in the presence of a catalyst prepared from certain Group VIII metal compounds, e.g., palladium compounds, an anion of a non-hydrohalogenic acid having a pKa less than about 6 and certain bidentate ligands of phosphorus, arsenic or antimony results in the formation of a linear alternating polymer having units of the formula

where A is the moiety obtained by polymerization through the ethylenic unsaturation of the ethylenically unsaturated hydrocarbon. In the case of such polymerization of carbon monoxide and ethylene, the polymeric units are of the formula

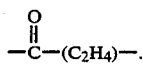

In general, the polymerization follows a typical temperature-reaction rate relationship. For example, in the case of polymerizations employing catalyst compositions formed in part from non-hydrohalogenic acids having a pKa less than 2, a conventionally preferred class of acids, a higher reaction temperature leads to a higher reaction rate with lower reaction rates being observed at lower temperatures. It would be of advantage to provide for polymerizations which observe faster reaction rates at relatively low temperatures as well as catalyst compositions which are more active at such lower reaction temperatures.

SUMMARY OF THE INVENTION

The present invention relates to the polymerization of carbon monoxide and at least one ethylenically unsaturated hydrocarbon in the presence of novel catalyst compositions which exhibit greater activity at relatively low reaction temperatures than is observed at higher reaction temperatures. More particularly, the invention relates to a process for the polymerization of carbon monoxide and at least one ethylenically unsaturated hydrocarbon in the presence of a catalyst composition formed from a palladium compound, an anion of a non-hydrohalogenic acid having a pKa more than about 2 but less than about 4 and certain bidentate hydrocarbyl phosphine ligands.

DESCRIPTION OF THE INVENTION

The present invention relates to a polymerization process employing a catalyst composition formed from a palladium compound, an anion of a non-hydrohalogenic acid having a pKa more than about 2 but less than about 4, and bidentate hydrocarbyl phosphine ligands, under typical polymerization pressures but under controlled reaction temperature.

The acid from which the anion catalyst component is derived is preferably an oxygen-containing acid having a pKa, measured in water at 18° C., which is above about 2 but below about 4. The acid is an inorganic acid such as phosphoric acid, arsenic acid, nitrous acid or selenious acid but is preferably an organic monocarboxylic acid or dicarboxylic acid such as tartaric acid, 2,5-dihydroxybenzoic acid, acetoacetic acid, bromacetic acid, 2-chlorobenzoic acid, α-chlorobutyric acid, cyanoacetic acid, (2-cyanophenoxy)acetic acid, chloroacetic acid, glycolic acid, 2-gluorobenzoic acid, and 2-furan-carboxylic acid. Best results are obtained using the anion of an acid selected from phosphoric acid, tartaric acid and 2,5-dihydroxybenzoic acid. In the catalyst compositions of the invention, the anion is provided in a quantity from about 0.5 to about 200 equivalents per gram-atom of palladium (as the compound), preferably from about 1 to about 100 equivalents per gram-atom of palladium.

The method of providing the anion is not critical. The anion is provided as the acid or alternatively is provided as a metal salt of the acid. Preferred salts for provision of the anion are non-noble transition metal salts, i.e., salts of Group IB-Group VIIB of the Periodic Table of Elements. Particularly useful as a non-noble transition metal salt is a copper salt.

The palladium compound is preferably a palladium carboxylate. In part for reasons of availability, palladium acetate is a particularly preferred palladium compound although palladium propionate and palladium octanoate are also suitable. In one modification, the palladium moiety and the anion of the acid are provided as a single compound, e.g., palladium tartarate, palladium chloroacetate or palladium ortho-chlorobenzoate.

The bidentate phosphorus ligand employed in the catalyst composition is a ligand of the formula

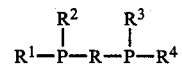

wherein $R^1$, $R^2$, $R^3$ and $R^4$ independently are hydrocarbyl of from 1 to 20 carbon atoms inclusive but preferably are aryl of from 6 to 10 carbon atoms inclusive, more preferably phenyl, R is a divalent hydrocarbyl bridging group of from 2 to 10 carbon atoms inclusive and with from 2 to 4, preferably 3 carbon atoms in the phosphorus-phosphorus bridge. The preferred R group is the trimethylene —$CH_2$—$CH_2$—$CH_2$— group. Illustrative $R^1$, $R^2$, $R^3$ and $R^4$ groups include phenyl, dimethylphenyl, ethylphenyl, tolyl, and n-octylphenyl. Illustrative of the bidentate ligands containing the preferred trimethylene R group are 1,3-bis(diphenylphosphino)propane, 1,3-bis[di(4-methylphenyl)-phosphino]propane, 1,3-bis[di(4-isopropylphenyl)phosphino]propane and 1,3-bis[di(2,4-dimethylphenyl)phosphino]propane. The ligand 1,3-bis(diphenyl-phosphino)propane is a particularly preferred bidentate ligand.

In the catalyst compositions, the bidentate ligand is present in an amount from about 0.1 mol to about 3 mol per mol of palladium compound, preferably from about 0.75 mol to about 2 mol per mol of palladium compound.

The ethylenically unsaturated hydrocarbons useful in the process of the invention are hydrocarbons from 2 to 20 carbon atoms inclusive and preferably from 2 to 10 carbon atoms inclusive. The hydrocarbons are wholly aliphatic, particularly ethylene and other α-olefins such as propylene, butene-1, octene-1 and dodecene-1 or incorporate aryl substituents on a carbon atom of the ethylenic unsaturation. Illustrative of this latter class of unsaturated hydrocarbons are styrene, p-methylstyrene and p-ethylstyrene. The preferred ethylenically unsaturated hydrocarbons for polymerization with carbon monoxide are ethylene or mixtures of ethylene and a second α-olefin, particularly propylene.

In the reaction mixture to be polymerized, the molar ratio of ethylenically unsaturated hydrocarbon to carbon monoxide is from about 10:1 to about 1:5 with molar ratios from about 5:1 to about 1:2 bein preferred. In the embodiments where more than one ethylenically unsaturated hydrocarbon is employed in the production of terpolymers, for example, terpolymers of carbon monoxide, ethylene and a second unsaturated hydrocarbon, the molar ratio of ethylene to second ethylenically unsaturated hydrocarbon is from about 400:1 to about 5:1, preferably from about 100:1 to about 10:1.

The quantity of catalyst composition to be utilized will vary, but amounts of catalyst composition containing from about $1 \times 10^{-7}$ to about $1 \times 10^{-3}$ gram-atom of palladium per mol of unsaturated hydrocarbon are suitable with amounts from about $1 \times 10^{-6}$ to about $1 \times 10^{-4}$ gram-atom of palladium per mole of unsaturated hydrocarbon being particularly useful.

The polymerization reaction is conducted under conditions of elevated temperature and pressure. Care must be taken not to employ too high a reaction temperature since catalyst activity decreases if too high a temperature is employed. Temperatures should be below about 115° C. with the range from abut 20° C. to about 110° C. being suitable. A preferred temperature range is from about 30° C. to about 100° C. The reaction pressure is not critical and pressures from about 1 bar to about 200 bar are satisfactory, but preferably from about 20 bar to about 200 bar.

In some embodiments of the process of the invention, it is useful to add a quinone to further enhance the activity of the catalyst. Suitable quinones are quinones of from 6 to 20 carbon atoms inclusive and include benzoquinones, naphthaquinones and anthraquinones. Benzoquinones are preferred, especially 1,4-benzoquinone. The use of quinone is optional, and amounts of quinone up to about 10,000 mol per gram-atom of palladium are useful with an amount up to about 5,000 mol per gram-atom of palladium being preferred.

The reaction is conducted in the liquid phase in the presence of a diluent, preferably a lower alkanol of up to 10 carbon atoms. Methanol is a particularly useful diluent. The method of contacting the reactants is not critical and is effected by shaking, stirring or other conventional means. Subsequent to reaction, the polymer product is recovered by conventional methods as by filtration or decantation. The product may contain residues of the catalyst which may be removed, if desired, by contact with a solvent selective for the residue.

The polyketone products of the polymerization process of the invention are known materials of known utility as premium thermoplastics. They are formed into sheets or molded into shaped articles finding application as parts in the auto industry or as containers for beverages and food.

The invention will now be further illustrated by means of the following illustrative embodiments and comparative examples which are illustrative only and are not to be construed as limiting.

COMPARATIVE EXAMPLE I

To a stirred autoclave of 300 ml capacity was charged a catalyst solution containing 50 ml of methanol, 0.1 mmol of palladium acetate, 2 mmol of acetic acid (pKa=4.75) and 0.15 mmol of 1,3-bis(diphenylphosphino)propane. After removal of any air present by evacuation of the autoclave, ethylene was introduced under pressure until a pressure of 30 bar had been reached, followed by addition of carbon monoxide until a pressure of 60 bar was obtained. The contents of the autoclave were brought to 135° C. and maintained for 15 hours, after which the autoclave was cooled to room temperature and the pressure released. A very small amount of polymeric material was obtained.

COMPARATIVE EXAMPLE II

The procedure of Comparative Example II was repeated except that the reaction temperature was 90° C. instead of 135° C. and the reaction time was 5 hours instead of 15 hours. Again, no more than a trace of polymer was obtained.

COMPARATIVE EXAMPLE III

The procedure Comparative Example I was repeated except that phosphoric acid (pKa=2.12) was employed instead of acetic acid and the reaction time was 5 hours instead of 15 hours. After the reaction was terminated by cooling the autoclave and releasing the pressure in the autoclave, the polymer formed was removed by filtration, washed with methanol and dried in vacuo. A copolymer product, 0.5 g, was obtained. The calculated reaction rate was 10 g of copolymer/g Pd/hr.

ILLUSTRATIVE EMBODIMENT I

The procedure of Comparative Example III was repeated except that the reaction temperature was 90° C. instead of 135° C. and the reaction time was 2.5 hours instead of 5 hours. The product, 11 g of copolymer was obtained. The calculated reaction rate was 440 g of copolymer/g Pd/hr.

ILLUSTRATIVE EMBODIMENT II

The procedure of Comparative Example III was obtained except that the catalyst solution contained tartaric acid (pKa=2.98) instead of phosphoric acid, the reaction temperature was 90° C. instead of 135° C. and the reaction time was 2 hours instead of 5 hours. 9.3 g of copolymer was obtained at a calculated reaction rate of 465 g of copolymer/g Pd/hr.

ILLUSTRATIVE EMBODIMENT III

The procedure of Comparative Example III was repeated except that the catalyst solution contained 2,5-dihydroxybenzoic acid (pKa=2.97) instead of phosphoric acid and the reaction temperature was 90° C. instead of 135° C. The copolymer product, 6.4 g, was obtained at a calculated reaction rate of 128 g of copolymer/g Pd/hr.

The carbon monoxide/ethylene copolymers prepared according to Illustrative Embodiments I-III had a melting point of 257° C. From $^{13}$C-NMR analysis it was determined that the polymers had a linear alternating structure consisting of units of the formula

ILLUSTRATIVE EMBODIMENT IV

When the procedure of Illustrative Embodiment I is repeated in the additional presence of a minor amount of propylene, a similar carbon monoxide/ethylene/propylene terepolymer will be obtained.

What is claimed is:

1. In the process of producing linear alternating polymers of carbon monoxide and at least one olefinically unsaturated hydrocarbon under polymerization conditions in the presence of a catalyst formed from a palladium compound, the anion of a non-hydrohalogenic acid having a pKa less than about 6 and bidentate hydrocarbyl phosphorus ligands, the improvement wherein the acid is selected from a group consisting of phosphoric acid, arsenic acid, nitrous acid, selenious acid, tartaric acid, 2,5-dihydroxybenzoic acid, bromacetic acid, 2-chlorobenzoic acid, α-chlorobutyric acid, cyanoacetic acid, (2-cyanophenoxy) acetic acid, chloroacetic acid, glycolic acid, and 2-furan-carboxylic acid, and wherein polymerization temperature is below about 115° C.

2. The process of claim 1 wherein the anion is an anion of an acid selected from phosphoric acid, tartaric acid or 2,5-dihydroxybenzoic acid.

3. The process of claim 2 wherein the polymerization temperature is from about 20° C. to about 110° C.

4. In the process of producing copolymers of carbon monoxide and ethylene under polymerization conditions in the presence of a catalyst formed from palladium acetate, an anion of an oxygen-containing acid having a pKa less than about 6 and 1,3-bis(diphenylphosphino)propane, the improvement wherein the acid is selected from a group consisting of phosphoric acid, arsenic acid, nitrous acid, selenious acid, tartaric acid, 2,5-dihydroxybenzoic acid, bromacetic acid, 2-chlorobenzoic acid, α-chlorobutyric acid, cyanoacetic acid, (2-cyanophenoxy) acetic acid, chloracetic acid, glycolic acid, and 2-furan-carboxylic acid, and wherein polymerization temperature is below about 115° C.

5. The process of claim 4 wherein the anion is an anion of an acid selected from phosphoric acid, tartaric acid or 2,5-dihydroxybenzoic acid.

6. The process of claim 4 wherein the polymerization temperature is from about 30° C. to about 100° C.

7. The process of claim 6 wherein the acid is phosphoric acid.

8. The process of claim 6 wherein the acid is tartaric acid.

* * * * *